(No Model.)

L. STEVENS.
NON-OXIDIZABLE LINING FOR SUPERHEATERS.

No. 569,251. Patented Oct. 13, 1896.

Attest
Walter Donaldson
F. L. Middleton

Inventor
Levi Stevens
by Ellis Spear
Atty.

United States Patent Office.

LEVI STEVENS, OF TRENTON, NEW JERSEY.

NON-OXIDIZABLE LINING FOR SUPERHEATERS.

SPECIFICATION forming part of Letters Patent No. 569,251, dated October 13, 1896.

Original application filed December 13, 1895, Serial No. 572,023. Divided and this application filed January 8, 1896. Serial No. 574,727. (No model.)

*To all whom it may concern:*

Be it known that I, LEVI STEVENS, a citizen of the United States, residing at Trenton, in the county of Mercer and State of New Jersey, have invented certain new and useful Improvements in Non-Oxidizable Lining for Superheaters, of which the following is a specification, reference being had therein to the accompanying drawings.

My invention relates to the lining of steam-superheaters. I have shown my said invention as applied to a superheater designed to be used in connection with a gas-making apparatus, but do not confine myself to this particular form or use of the superheater.

Said invention consists in an improved lining and in an improved method or form of applying the materials to form said lining.

The superheater which I have shown herein and in which my invention is used and embodied is illustrated in the accompanying drawings, in which—

Figure 1:
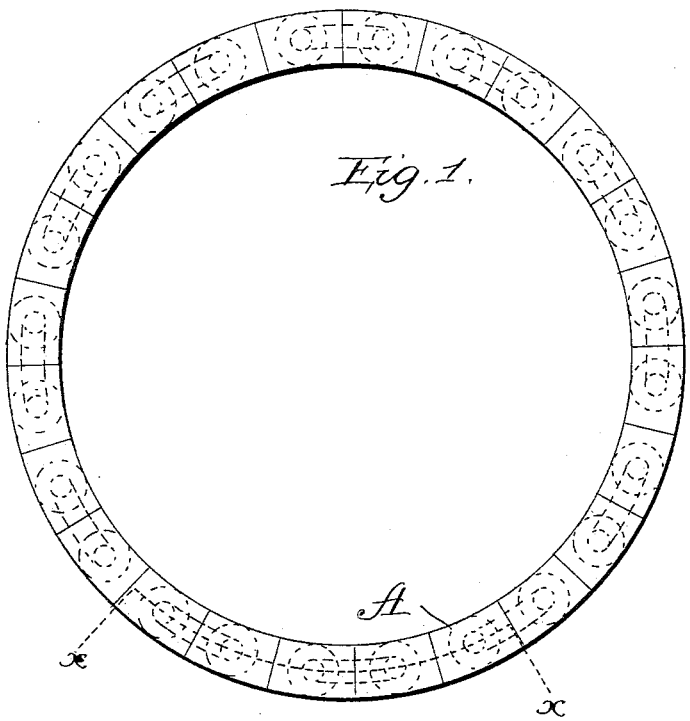
Figure 2:
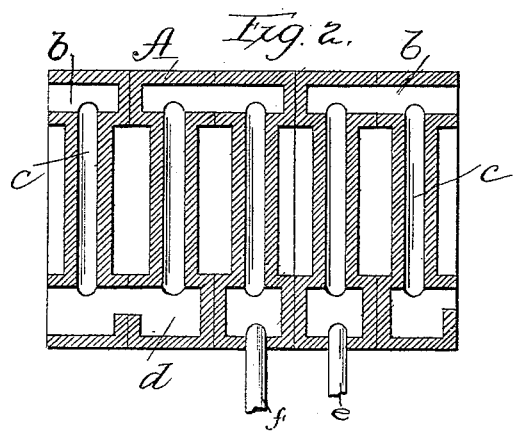

Figure 1 represents a horizontal plan of my superheater. Fig. 2 represents a vertical section of a part of the same on line $x\,x$ of Fig. 1.

For the purpose for which my invention is designed a superheater must be able to resist the action of the oxygen at a very high temperature. For example, in a gas-making apparatus such as that shown in an application filed by me in the United States Patent Office December 13, 1895, Serial No. 572,023, (of which this is a division,) the superheater must be raised to 1,600° Fahrenheit in order to deliver steam to the generator at a heat from 800° to 1,000° Fahrenheit.

It has heretofore not been found practicable to provide any material which would perfectly withstand the action of free oxygen in a superheater at such temperatures. Taken alone, I have found prussiate of potash defective, but I have also found that silica is an important element in forming a non-oxidizable lining; and the material which forms the lining in my invention consists of a solution of silica combined with prussiate of potash or an equivalent material.

As an example of the mode of applying this material to a superheater I refer to the form shown in the accompanying drawings. The superheater shown has annular form and is made up of cast sections A, in which are horizontal passages $b$ and vertical passages $c$, and below the horizontal passages are chambers $d$ in each section, forming a part of the passage. These sections are cast in the ordinary manner with cores, the chamber at the bottom being for the purpose of receiving the sand and scales from the casting, so that the steam-passages may not be obstructed. The inlet and outlet pipes are indicated at $e\,f$.

The composition above referred to is prepared in solution for application to the casting. In making this solution I preferably use the silicate of potash called "liquid glass," in which I dissolve sufficient red or yellow prussiate of potash to make a thick paint at the temperature of 200° Fahrenheit.

After the cores have been prepared in the usual manner and dried they are painted with a heavy coating of this preparation at the above temperature and again dried, when they are ready to set in the molds. The casting must not be pickled or scaled with sulfurous acid. The sections are finished on whatever radius the superheater may be. The connecting-passages are bored out and a ring or gland inserted. When all the parts are finished, before being set up or put together all the finished parts are painted with the same preparation as the cores. When the sections are put together, a heavy wrought-iron band is shrunk on the top and bottom. This makes a solid compact superheater. No steam must be put into it for testing. The work must be so perfectly done as not to require testing. When the apparatus is fired and the superheating-chamber brought to 1,200° Fahrenheit, a limited amount of dry steam is to be let in and allowed to pass through the superheater for about one hour, keeping the temperature up, which can readily be done. When these directions are followed, the oxygen of the steam will attack the iron, loosen up the sand that will be deposited in the chamber at the base of each section, and a silicious magnetic oxid of iron will be formed that will resist the action of oxygen at any temperature.

I claim—

1. A lining for steam-superheaters, consisting of a solution of silica combined with prussiate of potash, substantially as described.

2. The method hereinbefore described of lining a steam-superheater, consisting in coating the finished parts thereof with prussiate of potash combined with a solution of silica, then putting the parts together and subjecting them to heat.

3. The method hereinbefore described of coating superheaters, the same consisting in coating the castings with prussiate of potash combined with a solution of silica, putting the parts together to form a superheater, then heating the superheater to about 1,200° Fahrenheit, and then admitting dry steam.

4. The method hereinbefore described of coating the exposed parts of a steam-superheater, the same consisting in first coating the cores with prussiate of potash and solution of silica, then casting the parts, finishing, and afterward coating the finished parts of the castings with the same material and subsequently heating.

In testimony whereof I affix my signature in presence of two witnesses.

LEVI STEVENS.

Witnesses:
  HENRY E. COOPER,
  MARGARET V. COOPER.